United States Patent [19]

Gangloff

[11] Patent Number: 4,989,759
[45] Date of Patent: Feb. 5, 1991

[54] INSTANT COFFEE AND DRY PRODUCT DISPENSER

[76] Inventor: Robert B. Gangloff, 54 Dorchester St., Huntington Station, N.Y. 11746

[21] Appl. No.: 377,956

[22] Filed: Jul. 11, 1989

[51] Int. Cl.⁵ ............................................. B67B 5/00
[52] U.S. Cl. .................................. 222/153; 222/363; 222/368
[58] Field of Search ............... 222/363, 368, 153, 525; 215/206, 216, 221, 225

[56] References Cited

U.S. PATENT DOCUMENTS

| | | | |
|---|---|---|---|
| 589,775 | 9/1897 | Akeson | 222/368 |
| 2,992,759 | 7/1961 | Warlick | 222/363 X |
| 3,169,668 | 2/1965 | Ziegler | 222/363 X |
| 4,266,695 | 5/1981 | Ruperez | 222/363 X |

*Primary Examiner*—Andres Kashnikow
*Assistant Examiner*—Anthoula Pomrening
*Attorney, Agent, or Firm*—Terry M. Gernstein

[57] ABSTRACT

A metering dispensing cap is used in conjunction with an open-mouth container of granular food product, such as coffee, sugar or the like, and includes a hollow tubular body mounted in the cap to have its longitudinal axis located above and essentially parallel to a plane containing the open mouth of the container. An operating handle is mounted on the hollow body, and the body includes a transfer opening leading into the interior of the body, with the transfer opening being moved from a position to receive product from the container to a position to dispense that product via a product dispensing opening defined in the cap when the body is rotated about its longitudinal axis. A second embodiment of the device includes a locking feature which requires several different movements to operate the device whereby a child-proof feature is added.

2 Claims, 2 Drawing Sheets

INSTANT COFFEE AND DRY PRODUCT DISPENSER

TECHNICAL FIELD OF THE INVENTION

The present invention relates to the general art of product dispensing, and to the particular field of dispensing caps for use in conjunction with jars, containers and the like. Specifically, the present invention relates to dispensing caps which dispense metered amounts of a food product.

BACKGROUND OF THE INVENTION

The problem of serving or dispensing food products or food ingredients from containers in accurately controlled amounts is widely appreciated, and the dispensing art has numerous disclosures concerned with such problem.

While somewhat successful in solving this problem, many of the known solutions suffer various drawbacks due to either complexity of design or inconvenience of use. A further problem with many known metering dispenser designs is the inability of the designed device to fully seal the container between uses so that the product may have a tendency to dry out with the presently available designs.

A still further problem with many presently known metering devices is a propensity thereof to jam due to product, such as coffee, sugar or other such granular product, becoming lodged between moving elements of the device. Such jamming may prevent further use of the device, inhibit sealing of the device or vitiate the accuracy of a metering function of the device. The jamming problem may combine with a difficult-to-use drawback to produce a device that is nearly impossible to use, especially by one whose hands may be slightly disabled, as by age, disease or the like.

Accordingly, there is a need for a metering dispensing cap for use in conjunction with a container of granular food products that is easy to use, yet will not be subject to jamming and can seal the container between uses.

OBJECTS OF THE INVENTION

It is a main object of the present invention to provide a metering cap for use in conjunction with a container of granular food products which is easy and accurate to use.

It is another object of the present invention to provide a metering cap for use in conjunction with a container of granular food products which is easy and accurate to use and which is not susceptible to jamming.

It is another object of the present invention to provide a metering cap for use in conjunction with a container of granular food products which is easy and accurate to use that is able to seal the container between uses.

It is another object of the present invention to provide a metering cap for use in conjunction with a container of granular food products which is convenient and accurate to use.

SUMMARY OF THE INVENTION

These, and other, objects are achieved by a metering dispenser cap for use in conjunction with an open-mouth container of granular food products, such as coffee, sugar and the like. The dispenser cap includes a cylindrical product dispensing element mounted therein to rotate about an axis that is longitudinal with respect to the dispensing element and is positioned to be parallel and spaced from a plane containing the mouth of the container. The dispensing element is rotated by means of a lever-like operating handle positioned on the outside of the cap and has a transfer opening that is orientable to be congruent with the container open mouth and with a product dispensing opening defined in the cap.

When the transfer opening is out of position with respect to the cap product dispensing opening, the container is sealed.

In one embodiment of the invention, the cylindrical dispensing element is filled by simply inverting the capped container, and in a second embodiment, a child-proof mechanism is included.

Using the metering dispensing cap of the present invention, the container is sealed when the cylindrical dispensing transfer opening is not in overlapping relationship with the cap dispensing opening and the various elements of the cap are oriented with respect to each other so that jamming is unlikely and, in fact, in some instances, the operation of the cap produces a self-cleaning action that moves product away from areas that might cause jamming. The cap is operated by simply turning a lever-like handle, and thus is quite easy to use, even for someone who has impaired hand agility.

DETAILED DESCRIPTION OF THE PREFERRED EMBODIMENT OF THE INVENTION

Figure 1:
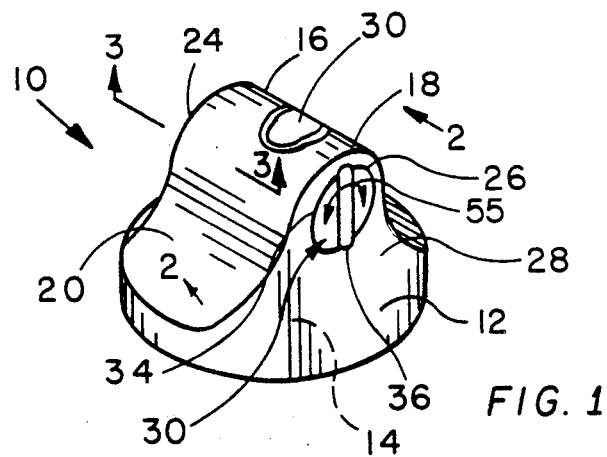
FIG. 1 is a perspective of a first embodiment of the metering dispenser cap of the present invention.

Shown in FIG. 1 is a metering dispensing cap 10 for use in conjunction with an open-mouth container C used to store granular products, such as coffee, sugar or like food products.

The cap 10 includes a neck portion 12 that is sized and shaped to be releasably mounted on the neck of the container adjacent to the open mouth thereof. The neck portion 12 shown in FIG. 1 is cylindrical and includes internal threads 14 that co-operatively engage the external threads on the container neck in the manner usual to caps. The cap 10 further includes a body 16 that spans the open mouth portion of the container in covering relation thereto. The body is a paraboloid in shape and includes a central section 18, side wing sections 20, and planar end sections 24 and 26. Junction sections, such as section 28 are also included to smoothly connect the planar end sections to the neck-engaging section 12.

A product dispensing opening 30 is defined in the central section 16, and an operating handle mounting section 32 is located on the end section 26. The mounting section 32 includes a circular opening 34 defined in the end section 26, and an operating handle 36 is mounted on the cap to rotate clockwise and counterclockwise on the end section 26. The operating handle engages the cap end section 26 adjacent to the opening 34 as shown in FIG. 1 for a purpose that will be apparent from the ensuing discussion.

The cap 10 is connected to the container by placing the cap on the container with the threads of the container engaging the threads of the cap, and rotating the cap and the container relative to each other.

Figure 2:
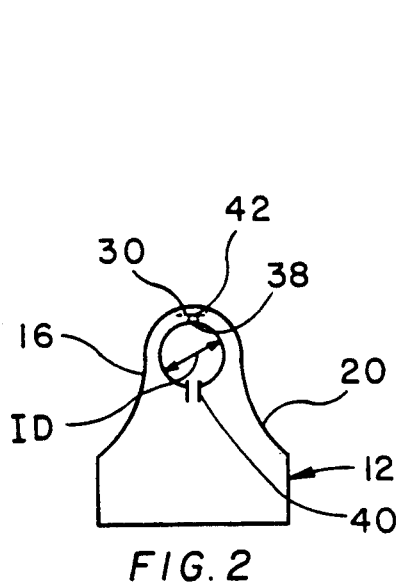
FIG. 2 is an elevational view of the FIG. 1 embodiment taken along line 2—2 of FIG. 1 and showing the chamber in the cap for rotatably receiving the dispensing element.
Figure 3:
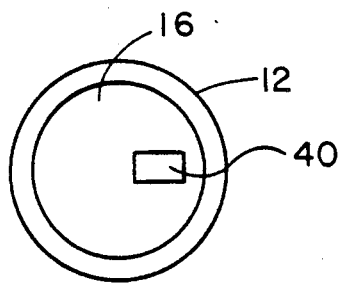
FIG. 3 is a plan view of the FIG. 1 embodiment taken along line 3—3 of FIG. 1.
Figure 4:
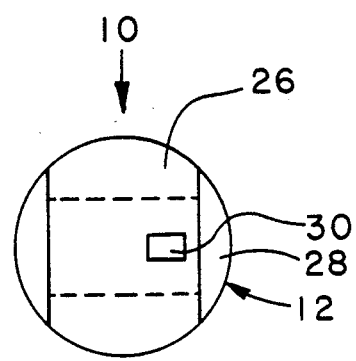
FIG. 4 is a top plan view of the FIG. 1 embodiment.

As is indicated in FIG. 2, the cap 10 includes a cylindrical chamber 38. A product influx slot 40 is defined in the cap adjacent to the chamber 38 to connect the chamber 38 to the container via the neck-engaging portion 12, and an efflux slot 42 is defined in the cap adjacent to the chamber to connect the chamber to the product dispensing opening 30. The chamber 38 has an inner diameter ID and a length as measured between the cap ends 24 and 26.

Figure 5:
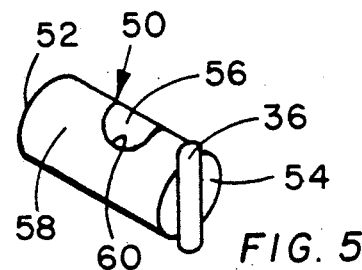
FIG. 5 is a perspective view of the cylindrical dispensing element of the present invention.
Figure 6:
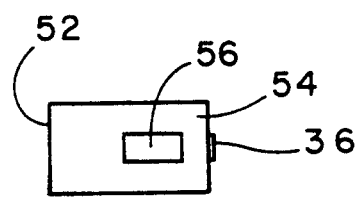
FIG. 6 is a top plan view of the dispensing element.
Figure 7:
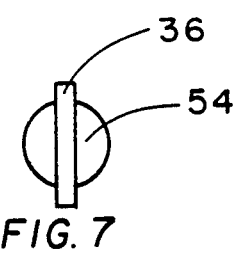
FIG. 7 is an end elevational view of the FIG. 5 cylindrical dispensing element.

The cap 10 includes a product dispensing element mounted in the chamber 38, and this dispensing element includes a cylindrical hollow body 50, best shown in FIG. 5. The hollow body 50 includes planar ends 52 and 54, with the operating handle 36 fixedly mounted on end 54 to rotate the body about the longitudinal centerline CL thereof when the handle is rotated as indicated in FIG. 1 by the double headed arrow 55. The body 50 is sized to have a length as measured between the ends 52 and 54 that is essentially equal to the length of the chamber 38 as measured between the cap ends 24 and 26. The outer diameter of the body 50 is also essentially equal to the inner diameter of the chamber 38 so that the body is accommodated in the chamber 38 to rotate about the longitudinal centerline CL thereof in that chamber as the operating handle is rotated.

The body 50 further includes a transfer opening 56 which connects the outer surface 58 of the body to the inner surface thereof, with the inner surface defining an inner metering chamber 60.

As can be seen by comparing FIGS. 1, 2 and 5, the body 50 is mounted in the chamber 38 to have the operating handle engaging the end 26 adjacent to the opening 34 in position to be grasped by a user. The body 50 is located in the chamber so that rotation of the operating handle in the directions 55 causes the body to rotate about the longitudinal axis CL so that the transfer opening 56 is moved between the slots 40 and 42.

As will be apparent, orienting the transfer opening 50 with the slot 40 will connect the inner metering chamber 60 to the container chamber so that product from the container will pass into the chamber 60 via the slot 40 when the container is inverted or sufficiently tipped. Further rotation of the handle 36 moves the transfer opening 56 out of communication with the slot 40 and closes the container since there is no path into the container.

Still further rotation of the handle 36 moves the transfer opening 56 into communication with the dispensing opening 30 via slots 42. Once such communication is established, inverting or tipping the container and cap will cause product in the chamber 60 to move through the slot 42 and through the dispensing opening 30.

The chamber 60 is sized to contain a metered amount of product, such as a single level teaspoon full or the like. In this manner, exact amounts of the product are easily and efficiently dispensed.

The chamber 38 is sized relative to the body 50 so that there is a snug fit of that body in the cap adjacent to the chamber 38. Because of such snug fit and the slots 40 and 42, there is little likelihood of any product being lodged between relatively moving elements. Due to this feature, there is little likelihood of the cap jamming or having its metering operations vitiated by the product being dispensed. Such tight fit also ensures a tight closure of the cap between uses so the product stored in the container will not dry out. The handle 36 is also easily operated, even by one who may have the dexterity of his hands impaired.

Figure 8:
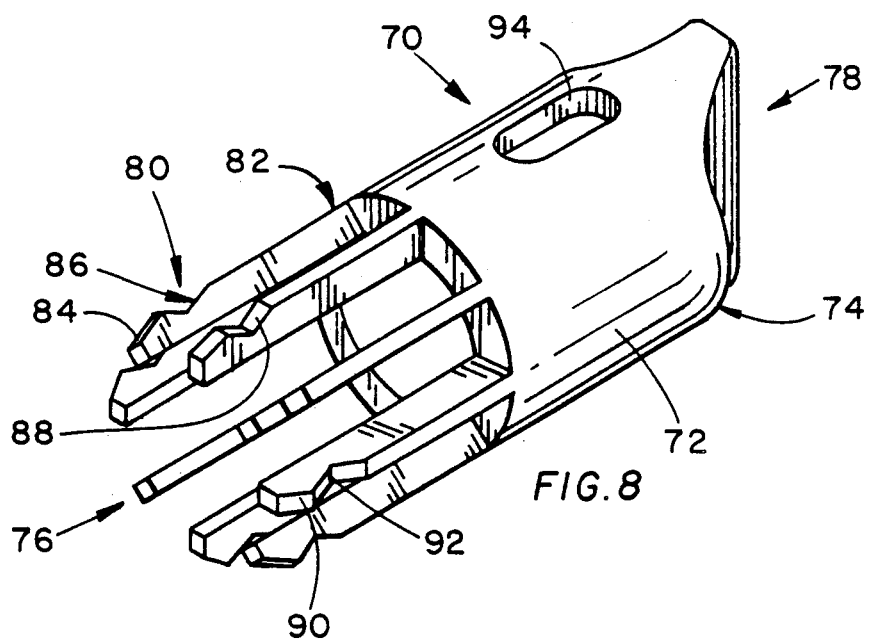
FIG. 8 is a perspective of an alternative form of the cylindrical barrel of the present invention.
Figure 9:
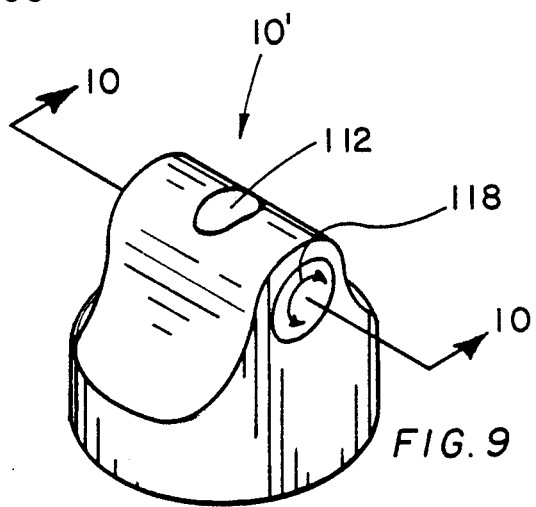
FIG. 9 is a perspective of a cap used in the alternative form of the device.
Figure 10:
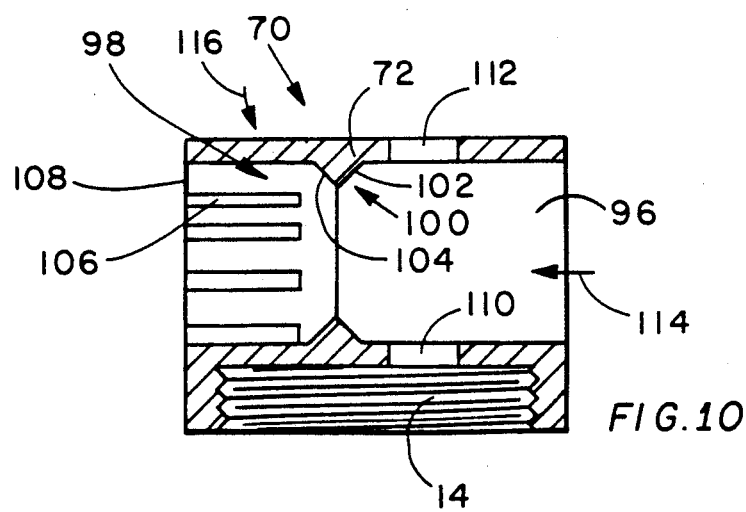
FIG. 10 is a view taken along line 10—10 of FIG. 9.

A further embodiment of the present invention is shown in FIGS. 8-10, and attention is now adverted thereto.

The cylindrical barrel 70 of the alternative embodiment is best shown in FIG. 8 and is seen to include a body 72 having a fore end 74 and a rear end 76 with a turn lever 78 on the fore end and gripping fingers, such as finger 80, on the rear end thereof. Each gripping finger includes a proximal portion 82 and a distal portion 84, with a notch 86 defined in the finger near the distal portion. The notch includes a first angled surface 88 that extends away from the proximal end towards the distal end, and a second angled surface 90 that intersects the first angled surface to form an apex 92 and which extends away from the first angled surface towards the distal portion. The fingers are flexible and the function and operation of these elements will be discussed below.

The barrel 70 includes a dispensing opening 94 and is hollow and functions as discussed above for the barrel 50 by rotating about its longitudinal axis.

The second embodiment includes a cap 10' that is similar to the cap 10, but is modified to accommodate the barrel 70. Thus, as best shown in FIG. 10, the cap 10' includes a first section 96 which accommodates the body portion 72 of the barrel, a second portion 98 which accommodates the finger portion of the barrel and a shoulder 100 separating such first and second portions. The shoulder is triangular and corresponds in shape to the notches on each of the fingers so that it includes a first surface 102 that will engage the finger notch first angled surface 88 and a second surface 104 that will engage the finger notch second angled surface 90 when the barrel is located in the cap 10'. When the barrel is so engaged and captured by the notch and the shoulder, the finger distal portions will be captured in slots, such as slot 106 that extend along the axis of the cap from a second end 108 towards the shoulder.

The cap also includes an entrance port 110 which connects the neck portion, and hence the container, to the first section 96 and a second exit port 112. The barrel includes port 94 so that material will flow into the barrel via the entrance port 110 when the barrel port 94 is aligned with the port 110, and then flow out of the barrel via the port 94 when that port is aligned with the exit port 112.

The handle 78 is used to rotate the barrel in the manner discussed above. However, due to the fingers 80 the barrel will not be rotatable until the fingers are disengaged from the slots 106. This disengagement is accomplished by forcing the barrel inwards towards the shoulder in the direction indicated by arrow 114 in FIG. 10. Such action will cause the notch angled surfaces 88 to "ride up" on the shoulder surface 102 thereby forcing the fingers inwardly in the direction indicated by arrow 116, and out of engagement with the slots 106. Once the fingers are out of the slots, the barrel is free to rotate in either direction about its axis as indicated in FIG. 9 by doubleheaded arrow 118.

The barrel 70, therefore, must be moved in two directions to dispense material, axially and then rotationally. The axial movement must precede the rotational movement. These movements must be in conjunction with an inversion of the container. Thus, the cap in the second embodiment of the present invention has a child-proof feature in addition to its metering feature. However, the device is still quite easy to operate. The exit port 112 is also located on the cap in a position such that the port 94 will not align with the port 112 unless the barrel has been pushed inwardly in the direction 114 sufficiently to release the notches from the shoulder 100. This offset feature can be seen in FIG. 10 by comparing the relative locations of the ports 110 and 112.

Relieving the inward pressure on the barrel will permit the natural resiliency of the fingers to force the barrel in a direction opposite to the direction of arrow 114 until the notches again seat against the shoulder thereby again locking the barrel to the cap.

It is understood that while certain forms of the present invention have been illustrated and described herein, it is not to be limited to the specific forms or arrangements of parts described and shown.

I claim:

1. A metering dispenser for use in conjunction with a container of granular product comprising:

(A) a cap for covering an open mouth container, said cap having a neck portion which has threads thereon for co-operatively engaging threads on the container to place said cap in covering relation with the open mouth of the container;

(B) a product dispensing element mounted in said cap, and which includes
   (1) a cylindrical hollow body positioned to extend over the open mouth of the container and having an inner volume and a longitudinal axis, said hollow body including fingers on said hollow body, with each finger including a notch defined therein, a shoulder defined in said cap to engage said finger notches, and a plurality of slots defined in said cap adjacent to said shoulder,
   (2) a transfer opening in said hollow body through which material passes into and out of said hollow body,
   (3) mounting means on said cap for mounting said hollow body to rotate about said body longitudinal axis from a filling position in communication with the interior of the container to receive product from that container to a dispensing position which is angularly spaced apart from said filling position, said longitudinal axis being located parallel to and spaced from a plane containing the open mouth of the container;

(C) a handle means connected to said product dispensing hollow body to rotate said body about said longitudinal axis;

(D) a product dispensing opening located in said cap to be positioned congruently with said transfer opening to permit material to pass through said product dispensing opening when said hollow body is in said dispensing position;

(E) a transfer slot defined in said cap for connecting the inner volume of the container with said transfer opening; and (F) a locking means for preventing rotation of said hollow body.

2. The metering dispensing cap defined in claim 1 further including an entrance port in said cap and wherein said product dispensing opening is offset with respect to said entrance port.

* * * * *